(12) United States Patent
Fitzel et al.

(10) Patent No.: US 6,813,760 B1
(45) Date of Patent: Nov. 2, 2004

(54) METHOD AND A TOOL FOR ESTIMATING PROBABILITY OF DATA CONTENTION IN A MULTI-PROCESSOR SHARED-MEMORY SYSTEM

(75) Inventors: Robert M. Fitzel, Kanata (CA); Tadeusz J. Drwiega, Kanata (CA); James R. Gauld, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 884 days.

(21) Appl. No.: 09/725,687

(22) Filed: Nov. 30, 2000

(51) Int. Cl.[7] .................................................. G06F 9/44
(52) U.S. Cl. ...................... 717/131; 717/127; 718/104
(58) Field of Search .............................. 717/127, 128, 717/129, 130, 131; 718/104

(56) References Cited

U.S. PATENT DOCUMENTS 5,361,352 A * 11/1994 Iwasawa et al. ............. 717/124
5,684,947 A * 11/1997 Horie ........................... 714/37
6,128,708 A * 10/2000 Fitzpatrick et al. ......... 711/147
6,308,316 B1 * 10/2001 Hashimoto et al. ......... 717/127
6,691,303 B2 * 2/2004 Guthrie et al. .............. 717/124

OTHER PUBLICATIONS

Sung Testing Shared Memory Parallel Programs IEEE 1998 pp. 539–566.*

* cited by examiner

Primary Examiner—Larry D. Donaghue
(74) Attorney, Agent, or Firm—Dennis R. Haszko; Borden Ladner Gervais LLP (57) ABSTRACT

Subroutines embedded in the software gather data during execution on a multiprocessor system with a shared resource. The data gathered relates to data contention (collisions) between processes in competing for the shared resource. Such data includes the number of collisions, the type of collisions, how much processing time is wasted by collisions, and how much processing time is used by successfully executed processes. After the data is gathered, this can be compiled and offloaded to a separate computer which calculates the software's performance relative to its shared resource.

15 Claims, 3 Drawing Sheets

METHOD AND A TOOL FOR ESTIMATING PROBABILITY OF DATA CONTENTION IN A MULTI-PROCESSOR SHARED-MEMORY SYSTEM

FIELD OF THE INVENTION

The present invention relates to computer software and, more specifically, to methods for determining software performance on a multiple processor computer system.

BACKGROUND TO THE INVENTION

In today's world, the need for faster, more powerful computing platforms is increasing. One approach to meeting this need is the development of multiprocessing (parallel processing) systems. Multiprocessing systems are systems in which two or more processors work in parallel (at the same time). In theory, two processors can do twice as much work in the same amount of time as one processor. Assuming all processors are working fully in parallel, systems with N processors could do N times as much work as a system with only one processor in the same amount of time. As we will see, not all processors can run fully in parallel all the time.

One class of multiprocessing systems uses shared memory. Shared-memory is memory that is shared amongst all of the processors. Every processor can access any piece of data in shared memory.

Shared-memory multiprocessing systems have an inherent problem when two or more processors try to access the same memory at the same time. This type of event is known as a collision (or data contention). Allowing both processors to alter the same data may result in data corruption. Therefore, some method must be used to prevent data contention or to recover from it. Data contention is undesirable in a multiprocessing system, since there is overhead associated with handling each collision. This overhead prevents the system from reaching its full capacity.

Because of the problem of data contention, developers are continually seeking new ways to reduce such contention. Unfortunately, the amount of processing time wasted or lost due to collisions is difficult to find. There are many factors that affect software performance.

Of these factors, data contention in a computer with a shared memory architecture can constitute the largest contributor to execution time inefficiency.

For multiple processor systems capable of parallel processing, the data contention scheme can affect the processing time lost due to data contention. One scheme, used in Nortel Network's XA-Core shared memory multiprocessing engine for its DMS family of network switches, is termed a roll back scheme. This scheme is somewhat analogous to predictive branching used in modern multiple pipeline microprocessors. Simply put, the computer executes processes and if a process cannot commit or write its data to memory due to data contention, all the work performed for that process is discarded. In predictive branching, at a branch, the computer takes a chance and chooses a path in that branch. This branch is then executed in the background while the main program executes. Once the main program actually reaches the branch and takes a path, if the branch executed in the background corresponds to the path taken by the main program, then the data produced by the predictive branching is used. Otherwise, if the actual path taken is not the path executed predictively, then the data produced by the predictive branching is discarded. This means that the processing time used to execute the predictive branching is wasted.

If developers could find the probability of data contention and, hence, the probability of wasted processing time, this knowledge can be used advantageously to reduce such contention by either redesigning the software, rewriting the code, or redesigning the hardware.

SUMMARY OF THE INVENTION

The present invention provides methods which fulfill the above described need. Subroutines embedded in the software gather data during execution on a multiprocessor system with a shared resource. The data gathered relates to data contention (collisions) between processes in competing for the shared resource. Such data includes the number of collisions, the type of collisions, how much processing time is wasted by collisions, and how much processing time is used by successfully executed processes. After the data is gathered, this can be compiled and offloaded to a separate computer which calculates the software's performance relative to its shared resource.

In a first aspect the present invention provides a method of determining the performance of a computer program when the program is executed on a multiple processor computer system having a shared resource. The program produces multiple parallel processes which can be executed in parallel with all other processes and multiple serial processes which can execute in parallel only with parallel processes. The resource is shared between multiple processes such that the computer system implements a rollback scheme to arbitrate between processes which compete for access to said resource. The method comprises:

a) determining how many parallel processes complete their assigned tasks (Lp);

b) determining how many serial processes complete their assigned tasks (Ln);

c) determining how much processing time is used by parallel processes which complete their tasks (Up);

d) determining how much processing time is used by serial processes which complete their tasks (Un);

e) determining how may parallel processes have not been able to complete their tasks due to a first denial of access to the shared resource, said first denial of access being caused by a serial process (Rpn);

f) determining how many parallel processes have not been able to complete their tasks due to a second denial of access to the shared resource, said second denial of access being caused by another parallel process (Rpp);

g) determining how many serial processes have not been able to complete their tasks due to a third denial of access to the shared resource, said third denial of access being caused by a parallel process (Rnp);

h) determining how much processing time is spent by serial processes while waiting to finish its tasks, said waiting being caused by other serial processes finishing their tasks (W);

i) determining how much processing time is wasted by parallel processes which are not able to complete their tasks (COHp);

j) determining how much processing time is wasted by serial processes which are not able to complete their tasks (COHn); and     k) calculating a probability of a process not being able to complete its tasks due to competition for said resource, said probability being calculated using data gathered in steps a)–j), wherein,
said rollback scheme comprises:
determining between two or more processes competing for access to said resource which process gains access to said resource; and
causing processes which have not been granted access to said resource to discard results which have been previously obtained by said processes which have not been granted access.

In a second aspect the present invention provides a method of determining the effect on program performance of resource access contention between processes produced by a computer program executed on a multiple processor computer system having a resource shared among said processes, said method comprising:

a) inserting multiple subroutines in said program, said substantive measuring data relating to the access of said processes to said resource and the effect of said resource to the execution time and number of said processes;

b) gathering said data measured by said subroutines; and c) calculating a probability that contention between processes for said resource will result in wasted processing time, said probability being based on data gathered in step b).

DETAILED DESCRIPTION OF THE PREFERRED EMBODIMENT

In multiprocessor systems which are capable of parallel processing, two types of processes contend for a shared resource—parallel processes and serial processes. Parallel processes are processes which can execute in parallel with other processes. Thus, if a system has processors A & B parallel process A1 on processor A can execute concurrently with a parallel process B1 on processor B. Serial processes, on the other hand, can execute in parallel with other parallel processes but not with other serial processes. If serial process A2 is executing on processor A, serial process B2 on processor B must wait for process A2 to finish before executing. However, if parallel process A1 is executing on processor A, serial process B2 can execute concurrently on processor B.

From the above, if a multiprocessor system has a shared resource, such as memory, two possible collisions for access to the resource can occur: a parallel process can contend with another parallel process, and a parallel process can contend with a serial process. A serial process cannot contend with another serial process as these two cannot execute concurrently.

With such collisions, one process "wins" or is allowed access to the shared while the other process "loses" or is not allowed access to the resource. Different systems handle collisions between two processes differently.

Some systems "stall" or suspend the losing process until the winning process is alone with the shared resource. However, of interest to the invention are those systems which discard or "rollback" the processing that the losing process has already done. As an example, if parallel process A1 is executing on processor A and process B1 is executing on processor B, these two processes can contend for a shared memory resource.

Figure 1:
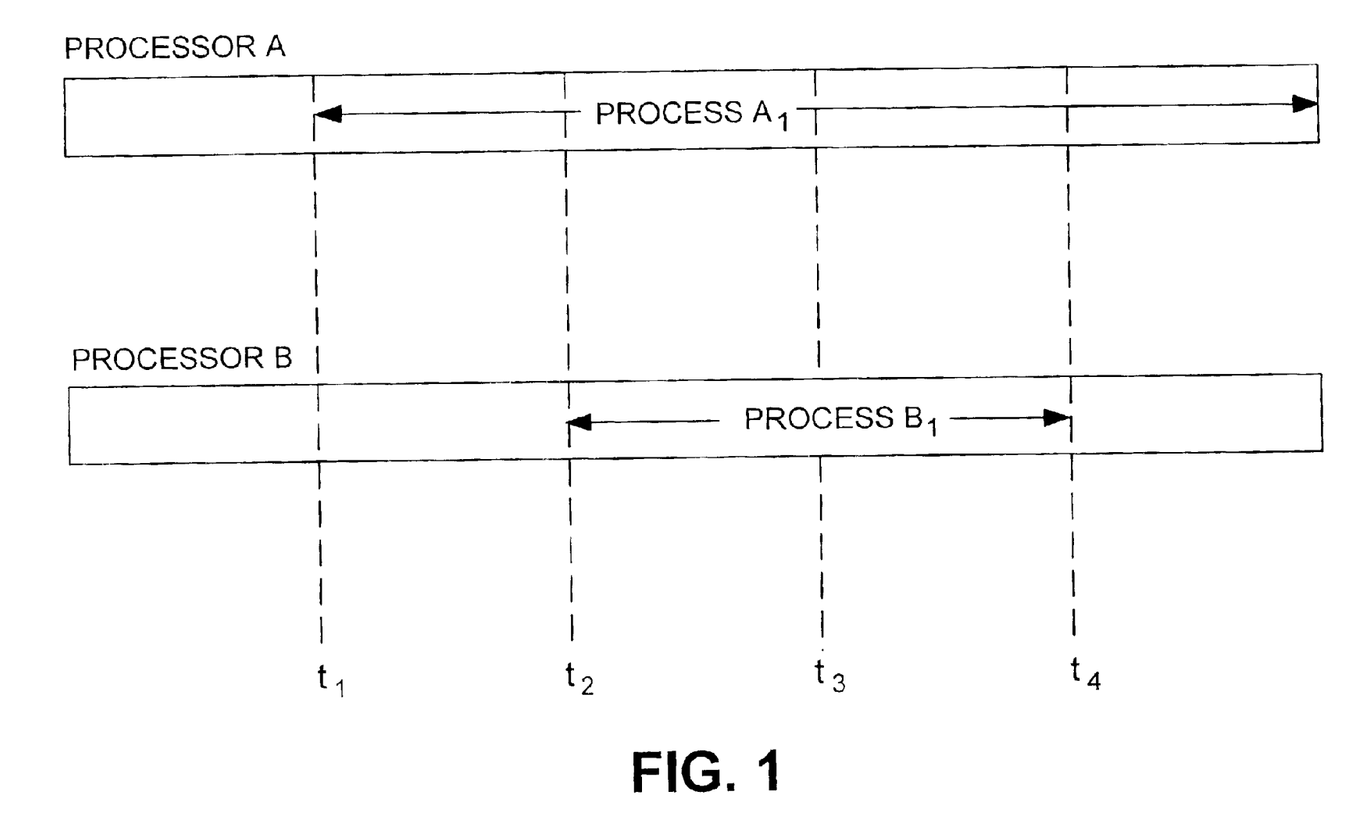
FIG. 1 is a timeline for two processes running on separate processors.

FIG. 1 illustrates a timeline for these two processes. As can be seen, process A1 begins execution at time $t_1$ while process B1 begins execution at time $t_2$. If at time $t_3$ process A1 accesses a shared memory resource and at time $t_4$ process B1 requests access to the same shared memory, then there is data contention between processes A1 & B1. If it is assumed that the system uses a memory lock-out scheme which prevents processes from accessing memory when another process is already accessing the memory, then process B1 must lose the contention as process A1 accessed the memory first. With a rollback scheme, since process B1 lost, then all the work that process B1 has done from time $t_2$ to time $t_4$ must be discarded as if it never occurred. Thus, the time interval between time $t_2$ and $t_4$ is considered "wasted" time, along with any processing time is took to undo any work during that time interval by process B1.

According to the invention, to measure software performance, data must be gathered while that software is being executed. This can be done by inserting specific subroutines in the software. These subroutines do not affect the software's performance as they merely increment counters or start and stop timers. Specifically, to count instances of processes, whenever a particular type of process is initiated, a counter is incremented. To count how many processes of a particular type finish, whenever a process of a specific type finishes, then another counter is incremented. Thus, if a parallel process initiates, then a counter for parallel processes begun is incremented. If the same parallel process ends successfully and is not rolled back, then a counter for successful parallel processes is incremented. If, on the other hand, this parallel process is rolled back, then depending on the competing process type, a counter for unsuccessful parallel processes is incremented.

Regarding the process timers, a specific timer is implemented for each processor. This timer is begun when a process initiates and is stopped when that process ends, whether successfully or unsuccessfully. If the process ends successfully, the time it took to complete the process is added to a running total of the processing time expended by successful processes. There are at least two of these running totals—one for successful parallel processes and another for successful serial processes. Alternatively, when a process does not complete and is rolled back, then the time spent on that unsuccessful process, kept track of by the timer for the processor on which the process is running, is added to a running total of time expended on unsuccessful processes. Again, much like for successful processes, two running totals are required—a running total for unsuccessful serial processes and a running total for unsuccessful parallel processes.

Another timer may be implemented for measuring waiting time for serial processes. If a serial process A3 must wait for serial process B3 to finish executing before it can execute, a timer can measure this wait time. Once serial process A3 detects that it needs to wait, the wait timer starts. The wait timer stops when the serial process waiting, in this example serial process A3, finally continues execution.

From the above, it should be clear that the following timers totals and counters would be used for data gathering:

Counters:
serial processes initiated;
parallel processes initiated;
serial process incomplete due to roll back;

parallel processes incomplete due to a contending parallel process;

parallel processed incomplete due to a contending serial process;

serial processes completed; and parallel processes completed.

Timers:

main timer (keeps track of processing time being spent by a process running on a particular processor); and wait timer (keeps track of processing time wasted by a serial process waiting for another serial process to finish)

Totals:

running total of wait time;

running total of wasted time due to serial process roll back;

running total of useful serial processing time;

running total of useful parallel processing time; and running total of wasted time due to parallel process rollback.

Figure 2:
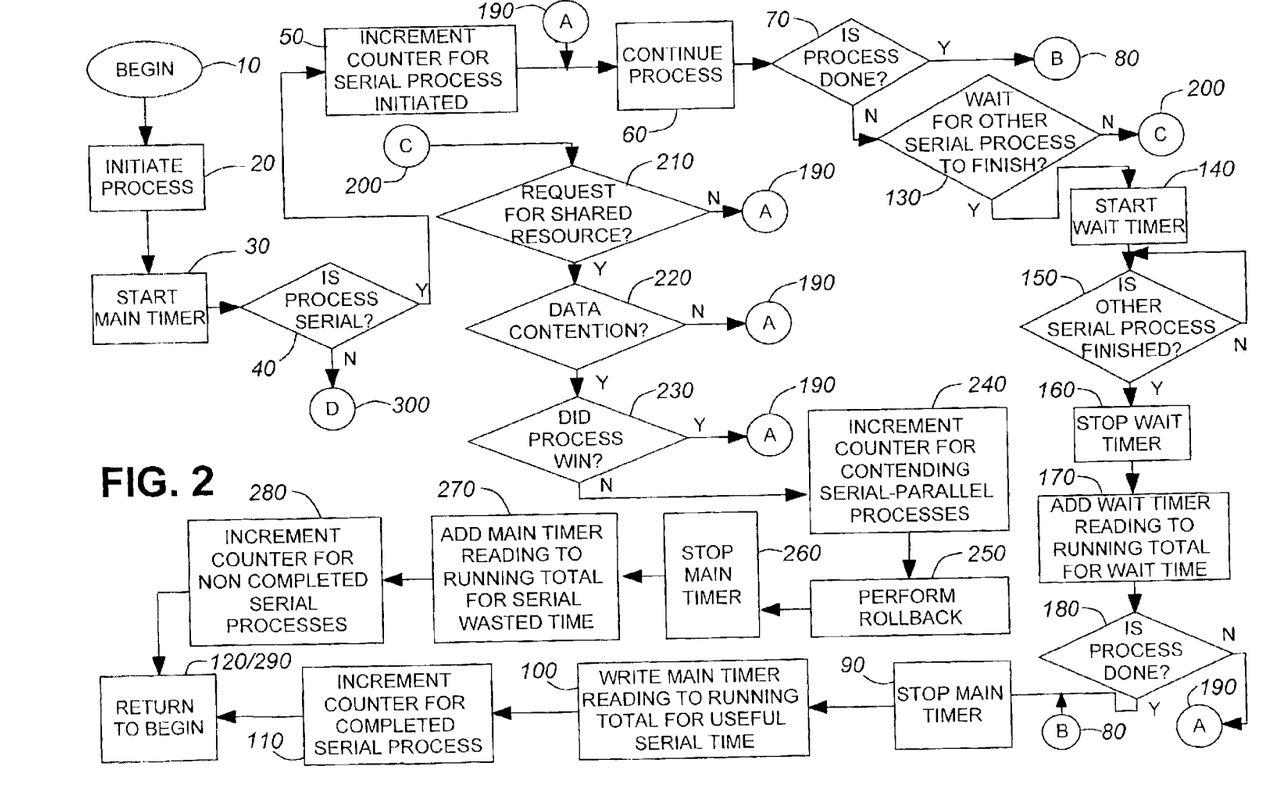
FIGS. 2 and 3 illustrate flowcharts detailing the steps in data gathering for each processor in a two processor system according to the invention.
Figure 3:
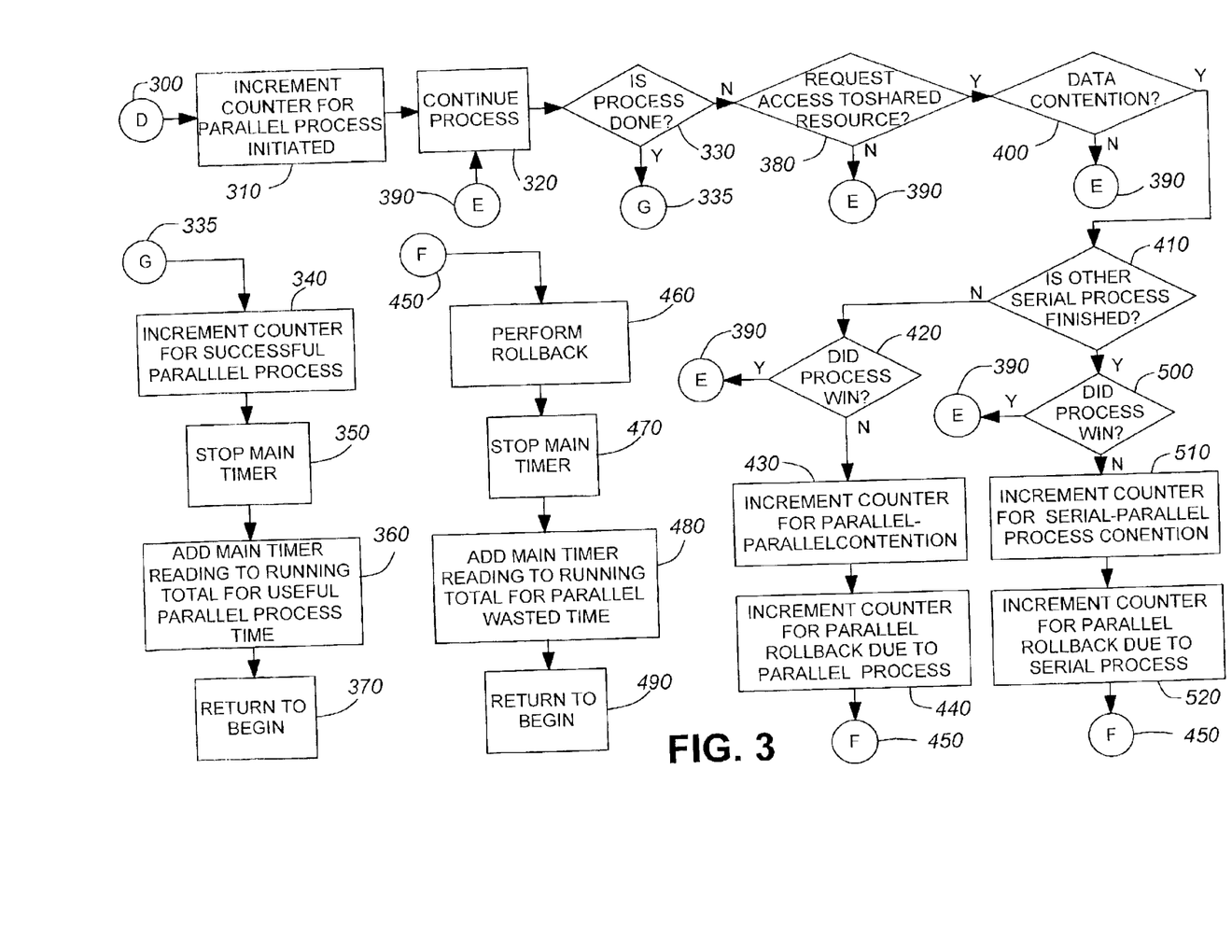

FIGS. 2 and 3 illustrate a flowchart detailing the steps in data gathering for each processor in a two processor system. It should be noted that, to avoid doubling the count for data contention, only losing processes increment the counters for data contention. Thus, if parallel process A4 contends with parallel process B4 increments the counter for parallel-parallel contention.

Referring to FIGS. 2 and 3, the process begins at step 10. Step 20 is the initiation of a process. Step 30 is that of starting the main timer. With the main timer started, step 40 is that of deciding whether the process initiated in step 20 is a parallel process or a serial process. If it is a serial process, then step 50 is that of incrementing a counter for serial processes initiated. Step 60 is that of continuing the work that the process is supposed to be executing. During that execution, step 70, that of checking whether the process is done, is periodically carried out. If the process is done, then, from the flow chart, connection B (80) is followed. From connect B, then step 90 is that of stopping the main timer. The main timer reading is then added to a running total which keeps track of useful processing time for serial processes (step 100). Then, the counter for completed serial processes is incremented (step 110). Step 120 is then that of returning to step 10 to begin the process area.

However, if the process is not done, step 130 is that of determining whether the serial process has to wait for another serial process to end execution before continuing. If this is the case, then step 140 is of starting a wait timer. Step 150 is of waiting in a loop until the other serial process is finished executing. Then, after the loop, step 170 adds the reading of the wait timer to a running total for wait time due to serial processes waiting for other serial processes. Step 180 is of checking, once again, whether the serial process being executed, is done. If so, then steps 90–120 are executed. If not, then connector A (190) returns the flow diagram to step 60.

Returning to step 130, if there is no need to wait for another serial process to finish, then connector C (200) directs the flow diagram to step 210, a decision as to whether the serial process being executed is requesting access to the shared resource. If there is no such request, then connector A (190) directs the flow diagram to step 60. If there is a request for a shared resource, then step 220 is determining if there is data contention (collision) between the serial process and another process on the other processor. If there is no data contention, then connector A (170) directs the flow diagram back to step 60.

If there is data contention, then step 230 decides if the serial process wins the contention. If so, then connector A (190) redirects the flow back to step 60. If the serial process did not win the contention, then step 240–290 are executed.

Step 240 increments the counter which counts the instance of serial processes colliding with parallel processes. Step 250 executes the roll back or the undoing of the work of the serial process being executed. Once this is done, then the main timer is stopped at step 260 and the main timers reading is added to the running total for wasted processing time due to rolled back serial processors (step 270). Step 280 increments the counter which tracks the number of incomplete serial processes and step 290 returns the flow to the beginning (step 10) to initiate another process.

Returning to step 40, if the process being executed is not a serial process, then connector D (300) directs the flow to step 310. Step 310 increments the counter which counts the number of parallel processes initiated. The parallel process is then continued in step 320. Then, during the process's execution, continuous checks as to whether the process is done are made (step 330). If the process is done, then connector G (330) directs the flow diagram to steps 340–370.

Step 340 is that of incrementing the counter which counts the number of unsuccessful parallel processes. After the incrementing if the counter, step 350 stops the main timer and step 360 adds the main timer reading to the running total for useful processing time expended by parallel processes. Step 370 then redirects the flow diagram back to step 10 where a new process can be initiated.

Returning to step 330, if the parallel process is not done, then step 380 checks if access to the shared resource is required by the parallel process. If not, the connector E (390) directs the flow diagram back to step 320, that of continuing the process. If there has been a request for access, then step 400 checks if there is a collision between the parallel process and a process executing on the other processor. If there is no data contention, then connector (390) returns the diagram to step 320.

If there is data contention or collision, step 410 determines the type of process the parallel process is colliding with. If the other process is a serial process, then step 420 then checks to see if the parallel process won or lost. If the parallel process won, then connector E (390) returns the flow to step 320.

From the diagram, if the parallel process did not win and the colliding process is a serial process then step 430 increments the counter for serial-parallel process collisions. Also, as the parallel process has lost the contention, then step 440 is that of incrementing the counter for parallel processes rolled back due to a serial process ruining the collision. Connector F (450) then directs the flow diagram to steps 460–490.

Step 460 is that of actually performing the rollback operation. Much like for serial processes rolled back, this involved undoing the work already performed by the parallel process. Step 470 then stops the main timer and step 480 adds the reading on the main timer to the running total for processing time wasted due to the parallel processes being rolled back. Step 490 returns the flow to step 10 where a new process can be initiated.

Returning to step 410, if the other colliding process is another parallel process, then step 500 determines if the parallel process being tracked has won. If so, then connector E (390) returns the flow to step 320. If the parallel process has lost, then step 510 increments the counter for parallel-parallel process collisions. Step 520 then increments the counter for parallel processes which have been rolled back due to other parallel processes. Connector F (450) then directs the flow to steps 460–490 as described above.

Once the data has been gathered, a number of calculations can be carried out to find an indication of the software's performance on the specific hardware platform it was executed on. For the embodiment described above, the hardware being a two processor system having a resource shared among multiple processes running on separate processors, the data gathered can be summarized with the following variables:

Qnp—probability of collision between a serial process and a parallel process;

Qpp—probability of collision between two parallel processes;

Dpn—time spent on rollbacks of parallel processes due to serial processes;

Dpp—time spent on rollbacks of parallel processes due to other parallel processes;

Upp—total time spent on successful executions of parallel processes run against other parallel processes;

Lnp—number of successful execution of serial processes run successful executions of parallel processes;

Lpn—number of successful executions of parallel processes run against successful executions of serial processes;

Up—the total time executing useful work from parallel processes;

Un—the total time executing useful work from serial processes;

Lp—number of successful executions of parallel processes;

Ln—number of successful executions of serial processes;

Rpn—the number of rollbacks of the parallel class caused by serial processes;

Rnp—the number of rollbacks of the serial class caused by parallel processes;

Rpp—the number of rollbacks of the parallel class caused by parallel processes;

COHp—the total collision overhead time when a parallel process was rolled back (includes the time spent performing the rollback and the process' time prior to the collision) (parallel wasted time);

COHn—the total collision overhead time when a serial process was rolled back (includes the time spent performing the rollback and the process' time prior to the collision) (serial wasted time); and W—time spent by a serial process waiting for another serial process to finish.

For clarity, the following definitions are provided:

Useful Time

A process' useful time is measured from the point in begins executing to the point it completes execution. The time required to dispatch or schedule a process is not included in the process time. When a process successfully completes, the process' time is added to one of two running sums of useful time. If the process was from the parallel class, the process' time is added to the useful parallel time (Up); if the process was from the serial class, the process' time is added to the useful serial time (Un). Processes that rollback do not accumulate useful time. Upon successful completion of a process from the parallel class, a count of successful executions from that class is incremented (Lp). Similarly, the number of successful executions form the serial class (Ln) is incremented when a process from that class successfully completes.

Collision Overhead

When a process is rolled back, all of its work is discarded (is not included in the useful time sum.) The time of the process' work prior to the collision plus the time required to perform the rollback is considered collision overhead.

Serial Waiting Time

As described earlier, a process from the serial class will have to wait for a second process from its class to finish before the first one can start. This waiting time is measured, since it represents a period during which one processor is not running in parallel. The waiting time is measured form the point a process form the serial class is scheduled to the point where it actually begins executing.

The calculations to carried out are as follows:

First, we estimate the time spent on rollbacks from the parallel class caused by processes from the serial class $$Dpn = (COHp * Rpn)/(Rpn + Rpp).$$

This estimate takes a share of the total time spent on the rollbacks from the parallel class caused by processes form the serial class to the total number of rollbacks from the parallel class.

Second, we estimate the time spent on rollbacks form the parallel class caused by processes from that class. That time is $$Dpp = COHp - Dpn.$$

Third, we estimate the total time spent on successful executions in the parallel class run against successful executions from the same class:

$$Upp = Up - (Un + COHn - W - Dpn) - Dpp$$

Successful executions from the parallel class can run against:

a) rollbacks or successful executions from the serial class, which are represented by the term $(Un + COHn - W - Dpn)$, b) rollbacks from the parallel class caused by the parallel class Dpp, and c) against other successful executions from the parallel class, which are calculated by subtracting the terms a) and b) from the Up.

The end result desired, the probabilities of collision between specific process types, can be found as follows:

Qnp is estimated from the raw measurements using the following three formulae:

i) the number of successful executions from the serial class running against successful executions from the parallel class is estimated as, $$Lnp = \frac{Un - W - Dpn}{(Un/Ln)}$$

During successful executions of serial processes on one processor, the other processor can do only three things; successful executions form the parallel class, rollbacks from the parallel class or wait on scheduling serial processes. The numerator of the above formula subtracts the last two kinds of work, thus calculating the time spent on successful serial executions of processes from the parallel class. The denominator calculates the average time of a successful serial execution.

ii) the number of successful executions from the parallel class running against successful executions from the serial class is estimated as, $$Lpn = \frac{Un - W - Dpn}{(Up/Lp)}$$

The numerator is the same as in the previous formula because it is equal to the time of successful executions from the parallel class against successful executions from the serial class. The denominator calculates an average time of a successful execution from the parallel class.

iii) Qnp is estimated using the following formula:

$$Qnp = \frac{Rpn + Rnp}{\max(Lnp, Lpn) + Rpn + Rnp}$$

where, (Rpn+Rnp) is a number of rollbacks caused by the contention between the serial and the parallel class, and therefore it is equal to the number of parallel/serial pairs in contention between the serial and the parallel class, and therefore it is equal to the number of parallel/serial pairs in contention, and, max ($Ln_p$, $Lp_n$) estimates the number of non-colliding parallel/serial pairs and, max ($Ln_p$,$Lp_n$)+(Rpn+Rnp) estimates total number of parallel/serial pairs.

Qpp is estimated using the following formula:

$$Qpp = \frac{Rpp}{0.5 * Lpp + Rpp}$$

where,

Rpp measures the number of parallel/serial pairs in contention, and,

Lpp=Upp/(Up/Lp) estimates the number of the successful executions from the parallel class against the successful executions from that class, thus 0.5*Lpp estimates the number of non-colliding parallel/parallel pairs.

The method described above can be used for any multi-processor system with resource among the processor running different processes. The resource, for the embodiment above, a memory resource. This can be a specific location in memory, a database stored in memory, or the system memory as a whole. However, the resource need not be a subset of a memory system. It can be a peripheral, a bus, a network, or any other type of resource that a process may need access to. Even though the measurements are taken on a two-processor system, the estimates of the probabilities of data contention (Qnp and Qpp) apply for any N-processor system (N>1) running the same software.

The invention can be used to determine the suitability of a particular piece of software for any number of processors. Thus, if software A has 3 revisions, namely A.1, A.2 and A.3, each one may be run on hardware platform B (a two processor system) to check which revision runs most efficiently with respect to data contention. Since the probabilities of data contention are independent of the number of processors, the comparison will apply on a system with N processors (N>1). If revision A.2 runs more efficiently than the others on a two-processor system, then said revision is best suited for multiprocessing. Software suitability to a platform need not be limited to different revisions of the same software. If programs P1, P2, and P3 all perform the same function and are compatible with platform B, then finding the probability of data contention for each program will yield an indication as to which program will run more efficiently on platform B.

It should be noted that the invention can be extended to encompass multiple shared resources. By doing this, the delay or bottleneck resources can be determined. These would be the resources which account for most of the wasted time and/or the greatest probability of data contention. Simply put, this requires: data relating to collisions due to a specific shared resource is gathered, calculations based on this data are made, and the results compared. Based on the results, the shared resource which accounts for most of the wasted time can be determined. This can be remedied in numerous ways—adding more instances of the resource, rewriting the software, or increasing the capacity of the resource.

A person understanding the above-described invention may now conceive of alternative designs, using the principles described herein. All such designs which fall within the scope of the claims appended hereto are considered to be part of the present invention.

We claim:

1. A method of determining the performance of a computer program when said program is executed on a multiple processor computer system having a shared resource, said program producing multiple parallel processes which can be executed in parallel with other processes and multiple serial processes which can execute in parallel only with parallel processes, said resource being shared between multiple processes such that said computer system implements a rollback scheme to arbitrate between processes which compete for access to said resource, said method comprising:

a) determining how many parallel processes complete their assigned tasks (Lp);

b) determining how many serial processes complete their assigned tasks (Ln);

c) determining how much processing time is used by parallel processes which complete their tasks (Up);

d) determining how much processing time is used by serial processes which complete their tasks (Un);

e) determining how may parallel processes have not been able to complete their tasks due to a first denial of access to the shared resource, said first denial of access being caused by a serial process (Rpn);

f) determining how many parallel processes have not been able to complete their tasks due to a second denial of access to the shared resource, said second denial of access being caused by another parallel process (Rpp);

g) determining how many serial processes have not been able to complete their tasks due to a third denial of access to the shared resource, said third denial of access being caused by a parallel process (Rnp);

h) determining how much processing time is spent by serial processes while waiting to finish its tasks, said waiting being caused by other serial processes finishing their tasks (W);

i) determining how much processing time is wasted by parallel processes which are not able to complete their tasks (COHp);

j) determining how much processing time is wasted by serial processes which are not able to complete their tasks (COHn); and k) calculating a probability of a process not being able to complete its tasks due to competition for said resource, said probability being calculated using data gathered in steps a)–j), wherein, said rollback scheme comprises:
  determining between two or more processes competing for access to said resource which process gives access to said resource; and
  causing processes which have not been granted access to said resource to discard results which have been previously obtained by said processes which have not been granted access.

2. A method as in claim 1 further including inserting in said program substantives which gather said data gathered in steps a)–j).

3. A method as in claim 1 wherein said data gathered in steps a)–j) is sent to a second computer system and step k) is executed at said second computer system.

4. A method as in claim 1 wherein step k) is calculated using the formula, $$Qnp = \frac{Rpn + Rnp}{\max(Lnp, Lpn) + Rpn + Rnp}$$

where, max (Lnp, Lpn) is an estimate of the number of non-colliding parallel/serial process pairs;

Rpn is the number of parallel processes which have not been able to complete their tasks due to a denial of access to said resource caused by a serial process;

Qnp the probability of a process not being able to complete its tasks when a parallel process and a serial process compete for said resource;

Rnp is the number of serial processes which have not been able to compete their tasks due to a denial of access to said resource caused by a parallel process;

Lnp is the number of successful executions of parallel processes running against successful executions of serial processes; and Lpn is the number of successful executions of serial processes running against successful executions of parallel processes.

5. A method as in claim 1 wherein step k) is calculated using the formula $$Qpp = \frac{Rpp}{0.5Lpp + Rpp}$$

where,

Qpp is the probability of a process not being able to complete its tasks when a parallel process competes with another parallel process for said resource;

Rpp is the number of parallel processes in contention for said resource; and

Lpp estimates the number of successful executions of parallel processes when running against other parallel process.

6. A method as in claim 5 wherein $$Lpp = \frac{Upp}{Up/Lp}$$

where,

Upp is the total time spent on successful executions of parallel processes when run against other parallel processes;

Up is the total processing time spent by parallel processes which complete their tasks; and Lp is the number of parallel processes which complete their tasks.

7. A method as in claim 4 wherein Lpn is calculated using the formula:

$$Lpn = \frac{Un - W - Dpn}{(Up/Lp)}$$

where,

Up is the total processing time spent by parallel processes which complete their tasks;

Lp is the number of parallel processes which complete their tasks;

Un is how much processing time is used by serial processes which compete their tasks;

W is the processing time spent by serial processes while waiting to finish its tasks, said waiting being caused by other serial processes finishing their tasks; and Dpn is the time wasted by parallel processes due to contention for said resource with serial processes.

8. A method as in claim 7 wherein Dpn is calculated using the formula, $$Dpn = \frac{(COHp * Rpn)}{Rpn + Rpp}$$

where

Rpn is the number of parallel processes which have not been able to complete their tasks due to a denial of access to said resource caused by a serial process;

Rpp is the number of parallel processes in contention for said resource;

COHp is the amount of processing time wasted by parallel processes which have not been able to complete its tasks.

9. A method as in claim 6 wherein the total time spent on successful executions of parallel processes when run against other parallel processes is calculated using the formula, $$Upp=Up-(Un+COHn-W-Dpn)-Dpp$$

where

Upp is the total time spent on successful executions of parallel processes when run against other parallel processes;

Up is the total processing time spent by parallel processes which complete their tasks;

Un is how much processing time is used by serial processes which compete their tasks;

COHn is the amount of processing time wasted by serial processes which have not been able to complete its tasks;

W is the processing time spent by serial processes while waiting to finish its tasks, said waiting being caused by other serial processes finishing their tasks;

Dpn is the time wasted by parallel processes due to contention for said resource with serial processes; and Dpp is the time wasted by parallel processes due to contention for said resource with other parallel processes.

10. A method as in claim 9 wherein Dpp is calculated using the formula, $$Dpp = COHp - \left(\frac{(COHp + Rpn)}{Rpn + Rpp}\right)$$

where

Dpp is the time wasted by parallel processes due to contention for said resource with other parallel processes;

COHp is the amount of processing time wasted by parallel processes which have not been able to complete its tasks;

Rpn is the number of parallel processes which have not been able to complete their tasks due to a denial of access to said resource caused by a serial process; and Rpp is the number of parallel processes in contention for said resource.

11. A method of determining the effect on program performance of resource access contention between processes produced by a computer program executed on a multiple processor computer system having a resource shared among said processes, said method comprising:

a) inserting multiple subroutines in said program, said substantive measuring data relating to the access of said processes to said resource and the effect of said resource to the execution time and number of said processes;

b) gathering said data measured by said subroutines; and c) calculating a probability that contention between processes for said resource will result in wasted processing time, said probability being based on data gathered in step b).

12. A method as in claim 11 wherein said data gathered in step b) includes, a) the number of parallel processes which complete their assigned tasks (Lp);

b) the number serial processes which complete their assigned tasks (Ln);

c) processing time used by parallel processes which complete their tasks (Up);

d) processing time used by serial processes which complete their tasks (Un);

e) the number of parallel processes which have not been able to complete their tasks due to a first denial of access to the shared resource, said first denial of access being caused by a serial process (Rpn);

f) the number of parallel processes which have not been able to complete their tasks due to a second denial of access to the shared resource, said second denial of access being caused by another parallel process;

g) the number of serial processes which have not been able to complete their tasks due to a third denial of access to the shared resource, said third denial of access being caused by a parallel process (Rnp);

h) processing time used by serial processes while waiting to finish its tasks, said waiting being caused by other serial processes finishing their tasks (W);

i) processing time used wasted by parallel processes which are not able to complete their tasks (COHp); and j) processing time which is wasted by serial processes which are not able to complete their tasks (COHn).

13. A method as in claim 12 wherein said computer system implements a rollback scheme to arbitrate between processes competing for said resource, said rollback scheme comprising:

determining between two or more processes competing for access to said resource which process gives access to said resource; and causing processes which have not been granted access to said resource to discard results which have been previously obtained by said processes which have not been granted access.

14. A method as in claim 1 wherein said multiple processes complete for write access to said shared resource.

15. A method as in claim 11 wherein said multiple processes complete for write access to said shared resource.

* * * * *